(12) United States Patent
Song et al.

(10) Patent No.: US 12,072,686 B2
(45) Date of Patent: Aug. 27, 2024

(54) MOBILE BRAIN COMPUTER INTERFACE

(71) Applicant: Duke University, Durham, NC (US)

(72) Inventors: Allen Song, Durham, NC (US); Chris Petty, Durham, NC (US)

(73) Assignee: Duke University, Durham, NC (US)

( * ) Notice: Subject to any disclaimer, the term of this patent is extended or adjusted under 35 U.S.C. 154(b) by 0 days.

(21) Appl. No.: 18/336,342

(22) Filed: Jun. 16, 2023

(65) Prior Publication Data

US 2023/0333541 A1    Oct. 19, 2023

Related U.S. Application Data

(63) Continuation of application No. 16/821,114, filed on Mar. 17, 2020, now Pat. No. 11,720,081.

(60) Provisional application No. 62/819,863, filed on Mar. 18, 2019.

(51) Int. Cl.
| | |
|---|---|
| *G05B 19/41* | (2006.01) |
| *B25J 9/00* | (2006.01) |
| *B25J 9/16* | (2006.01) |
| *B25J 13/00* | (2006.01) |
| *G05B 19/4155* | (2006.01) |
| *G06F 3/01* | (2006.01) |

(52) U.S. Cl.
CPC ........ *G05B 19/4155* (2013.01); *B25J 9/0006* (2013.01); *B25J 9/1656* (2013.01); *B25J 13/00* (2013.01); *G06F 3/015* (2013.01); *G05B 2219/39292* (2013.01)

(58) Field of Classification Search
CPC ...... G05B 19/4155; G05B 2219/39292; G05B 19/0423; B25J 9/0006; B25J 9/1656; B25J 13/00; G06F 3/015; A61H 1/00
See application file for complete search history.

(56) References Cited

U.S. PATENT DOCUMENTS

| | | | |
|---|---|---|---|
| 2016/0235323 A1* | 8/2016 | Tadi | A61B 5/0006 |
| 2017/0213450 A1* | 7/2017 | Park | A61B 5/4812 |
| 2019/0099896 A1* | 4/2019 | Starr | B25J 11/008 |
| 2019/0388020 A1* | 12/2019 | Stauch | A61B 5/0022 |
| 2020/0081535 A1* | 3/2020 | Woo | G06F 3/015 |

\* cited by examiner

*Primary Examiner* — Kira Nguyen
(74) *Attorney, Agent, or Firm* — POLSINELLI PC

(57) ABSTRACT

A method includes receiving, by a mobile computing device from an electroencephalogram (EEG) monitoring headset, an incoming wireless communication signal including an EEG data stream. The method may further include processing, by an application running on the mobile computing device, the received EEG data stream to determine at least one actionable command for at least one peripheral device. The method may also include transmitting, by the mobile computing device to the at least one peripheral device, at least one outgoing wireless communication signal including the at least one determined actionable command.

19 Claims, 5 Drawing Sheets

MOBILE BRAIN COMPUTER INTERFACE

CROSS-REFERENCE TO RELATED APPLICATION

This application is a continuation of U.S. application Ser. No. 16/821,114, filed Mar. 17, 2020, which claims the benefit of priority of U.S. Application Ser. No. 62/819,863, filed Mar. 18, 2019, the contents of which are hereby incorporated herein by reference in their entirety.

BACKGROUND

A brain computer interface (BCI) is a system that facilitates a direct communication pathway between a functional brain and peripheral electronic devices. The communication pathway may be used, for instance, to calibrate the movement in physically challenged individuals. A BCI system records brain signals from the surface of the cortex through signaling devices implanted within the brain or from sensors placed over the scalp. These signals may then be processed to command connected peripheral device to perform numerous tasks or receive environmental feedback. With the help of a BCI system, for example, paralyzed and handicapped individuals can overcome their physical challenges and perform various day-to-day tasks by controlling robotics and receiving sensory feedback. Numerous technological developments in the field of computation, human sensing, along with the application of BCI technology for entertainment, gaming, communication, and control, are some of the major factors driving the growth of the BCI market.

SUMMARY

In an aspect, a method is provided. The method includes receiving, by a mobile computing device from an electroencephalogram (EEG) monitoring headset, an incoming wireless communication signal including an EEG data stream. The method may further include processing, by an application running on the mobile computing device, the received EEG data stream to determine at least one actionable command for at least one peripheral device. The method may also include transmitting, by the mobile computing device to the at least one peripheral device, at least one outgoing wireless communication signal including the at least one determined actionable command.

Another aspect of the present disclosure relates to a system that includes one or more hardware processors configured by machine-readable instructions. The processor(s) may be configured to receive, by a mobile computing device from an EEG monitoring headset, an incoming wireless communication signal including an EEG data stream. The processor(s) may be further configured to process, by an application running on the mobile computing device, the received EEG data stream to determine at least one actionable command for at least one peripheral device. The processor(s) may additionally be configured to transmit, by the mobile computing device to the at least one peripheral device, at least one outgoing wireless communication signal including the at least one determined actionable command.

Yet another aspect of the present disclosure relates to a non-transient computer-readable storage medium having instructions embodied thereon, the instructions being executable by one or more processors to perform functions that include receiving, by a mobile computing device from an EEG monitoring headset, an incoming wireless communication signal including an EEG data stream. The functions may also include processing, by an application running on the mobile computing device, the received EEG data stream to determine at least one actionable command for at least one peripheral device. The functions may additionally include transmitting, by the mobile computing device to the at least one peripheral device, at least one outgoing wireless communication signal including the at least one determined actionable command.

In yet a further aspect, a system is provided that includes means for receiving, by a mobile computing device from an EEG monitoring headset, an incoming wireless communication signal including an EEG data stream. The system may further include means for processing, by an application running on the mobile computing device, the received EEG data stream to determine at least one actionable command for at least one peripheral device. The system may also include means for transmitting, by the mobile computing device to the at least one peripheral device, at least one outgoing wireless communication signal including the at least one determined actionable command.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Example embodiments involve a mobile phone and mobile application (or "app") based solution to provide a BCI. Instead of using a laptop or fixed computer station, its onboard algorithms, and multiple physically connected peripheral devices (e.g. robotics, sensors), all functions of brain signal reception and processing, as well as control of peripheral devices, may be achieved by an app running onboard a mobile computing device, such as a smartphone or a touchpad. Such a setup leverages the existing computing power of the mobile computing device, and simplifies the mobility of a BCI, which may allow a user to perform daily functions with ease.

By using a mobile phone app, the traditional constraints of a BCI may be overcome, allowing for the creation of a fully mobile system. The utility of such a mobile BCI system may include applications in healthcare, entertainment, gaming, virtual reality (VR), and/or augmented reality (AR) systems. A purpose-written app running on a mobile computing device may receive brain signals wirelessly (e.g., through a Bluetooth connection) from any electroencephalogram (EEG) monitoring headset, process the signals in real time and generate actionable commands, and then control peripheral devices wirelessly (e.g., also through a Bluetooth connection). An algorithm that processes the brain signals can be plugged in by a third party developer to suit a particular purpose, and the peripheral devices can also be selected to meet specific demands.

Figure 1:
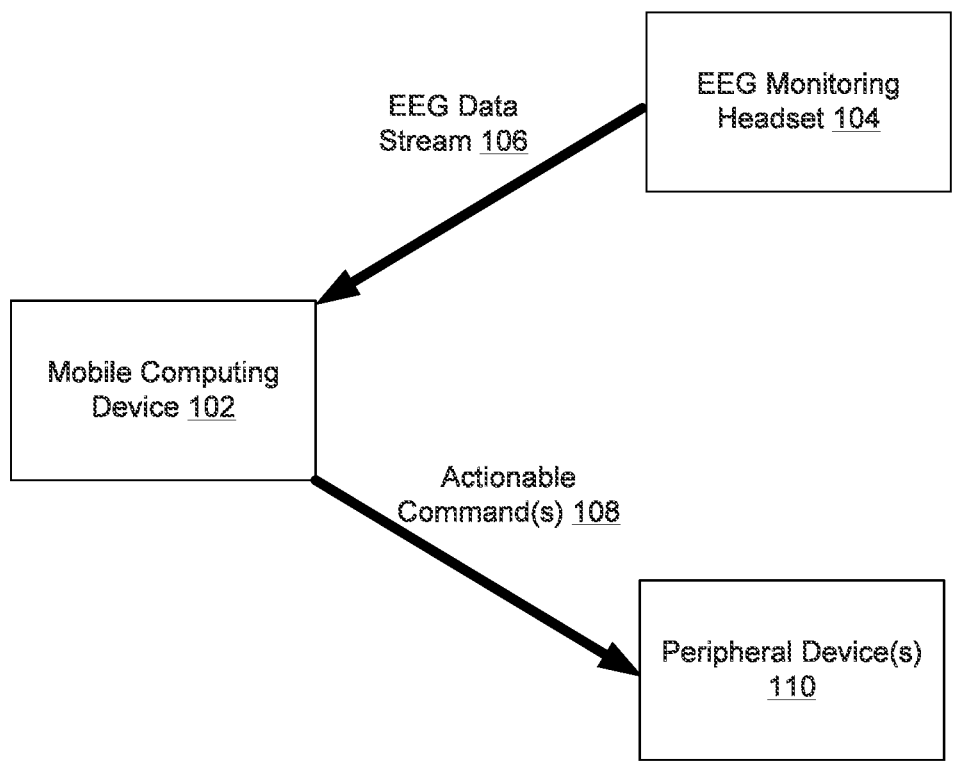
FIG. 1 is a data flow diagram, in accordance with example embodiments.

Referring now to the Figures, FIG. 1 is a data flow diagram, in accordance with example embodiments. More specifically, FIG. 1 shows communications that may occur between mobile computing device 102, EEG monitoring headset 104, and one or more peripheral device(s) 110. The communications may involve the transmissions of data using a short range device-to-device communication channel, such as a Bluetooth connection. In further examples, the communications may involve communications through a network as well or instead. In yet further examples, some or all of the communications may be transmitted through physical (e.g., wired) connections.

In some examples, mobile computing device 102 is a smartphone. In other examples, mobile computing device 102 is a tablet computer. Other types of mobile computing devices with or without a display interface may also be used. Mobile computing device 102 may be configured to receive and process EEG data stream 106 from EEG monitoring headset 104. The EEG monitoring headset 104 is any head mountable device configured to read brain signals (e.g., the electrical signals that pass between the neurons) and transmit the brain signals in the form of EEG data stream 106 to mobile computing device 102.

Mobile computing device 102 may be configured with software in the form of a mobile app that allows mobile computing device 102 to process EEG data stream 106 in real time or near real time in order to generate one or more actionable command(s) 108. The actionable command(s) 108 may then be transmitted by mobile computing device 102 to one or more peripheral device(s) 110 to control the peripheral device(s) 110. More specifically, the actionable command(s) 108 may physically drive one or more of the peripheral device(s) 110. The actionable command(s) 108 may also allow the mobile computing device 102 to collect feedback in the form of sensor data from one or more of the peripheral device(s) 110 as well or instead.

In some examples, some or all of the peripheral device(s) 110 may be physically connected to a user who is wearing EEG monitoring headset 104. An example of a peripheral device is a robotic walking apparatus such as a robotic cart. Another example of a peripheral device is a sensory vibrating motor, such as a wrist-mounted motor or another type of wearable motor. In further examples, some or all of the peripheral device(s) 110 may be physically disconnected from the user who is wearing EEG monitoring headset 104. For instance, actionable command(s) 108 may be used to control a robotic arm in a factory, fly a drone, or drive an autonomous vehicle. It should be understand that a wide of variety of peripheral device(s) 110 may be connected to a BCI system driven by mobile computing device 102.

Figure 2:
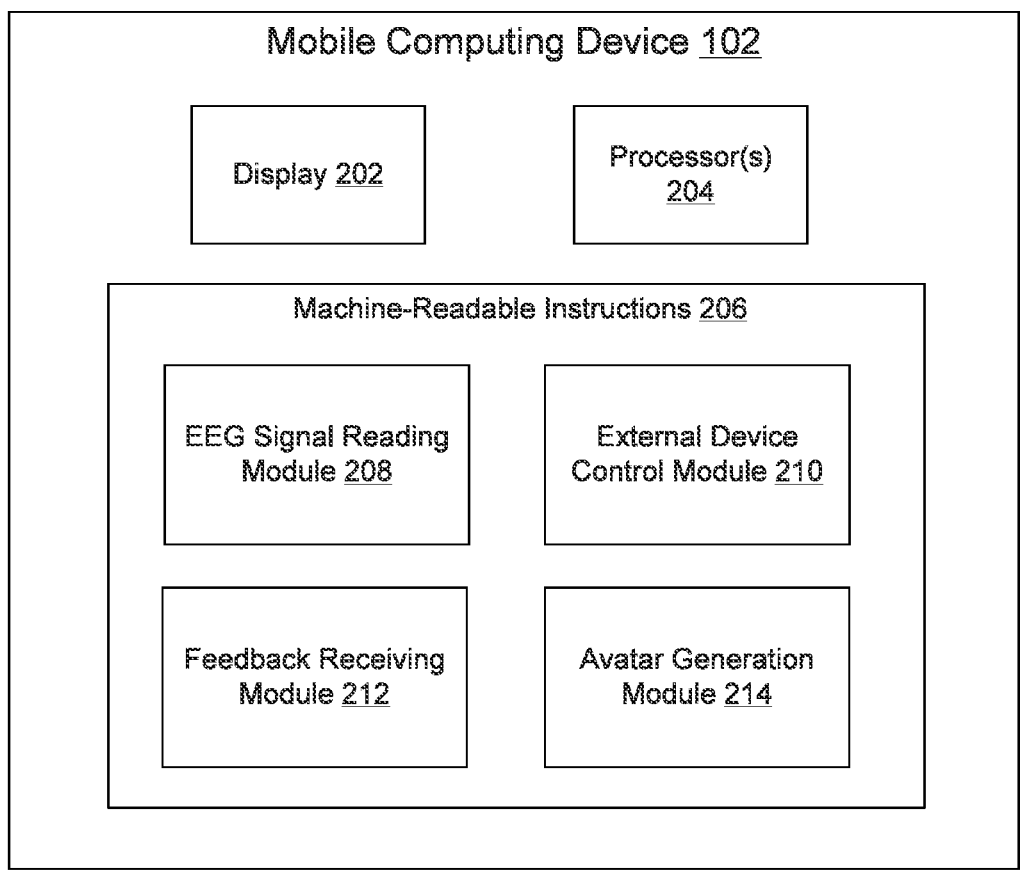
FIG. 2 illustrates a configuration of a mobile computing device, in accordance with example embodiments.

Next, FIG. 2 illustrates a configuration of a mobile device, in accordance with example embodiments. Mobile computing device 102 may be configured by machine-readable instructions 206. Machine-readable instructions 206 may include one or more instruction modules that are executable by one or more processor(s) 204. The instruction modules may include computer program modules. The instruction modules may include one or more of an EEG signal reading module 208, external device control module 210, feedback receiving module 212, avatar generation module 214, and/or other instruction modules. The one or more module(s) may enable one or more apps running on mobile computing device 102.

EEG signal reading module 208 may enable the mobile computing to receive an incoming wireless communication signal by mobile computing device 102 from an EEG monitoring headset. The communication signal may include an EEG data stream, which may be a continuous or intermittent representation of brain signals of a wearer of the EEG monitoring headset.

External device control module 210 may allow mobile computing device 102 to process the received EEG data stream to determine at least one actionable command for at least one peripheral device. Processing the received EEG data stream may involve the external device control module 210 running a developer-provided EEG data processing algorithm. For instance, the developer-provided EEG data processing algorithm may be a machine learning classifier trained to determine at least one actionable command based on the received EEG data stream. External device control module 210 may include functionality that allows a developer to easily change between EEG data processing algorithms (e.g., different brain signal classification algorithms) and/or different peripheral devices. A developer is therefore provided full flexibility to implement any algorithm in mobile computing device 102 to interface with the external device control module 210 to control external devices wirelessly.

External device control module 210 may provide actionable commands to control multiple peripheral devices simultaneously. For instance, a first peripheral device may be a wearable robotic walking apparatus. A first actionable command may actuate the wearable walking apparatus. A second peripheral device may be a sensory motor feedback device, such as a wrist-mounted vibrating device. A second actionable command may cause the sensory motor feedback device to provide sensory motor feedback during operation of the wearable robotic walking apparatus. In this manner, a paralyzed user of the system may receive indications when steps are taken with the walking apparatus through a peripheral device worn at a point that the user can feel. In this manner, a single mobile computing device may serve as an interface between each of multiple different peripheral devices.

In some examples, external device control module 210 may be configured to transmit an outgoing wireless communication signal from the mobile computing device to a peripheral device only after a probability of successful operation of the peripheral device crosses a threshold level based on the received EEG data stream. Accordingly, a mobile BCI may allow a user to progress through multiple discrete phases or modes, from training to active operation, all with the convenience of interfacing with a single fully mobile system.

Feedback receiving module 212 may enable mobile computing device 102 to receive an incoming wireless communication signal including sensor data from a peripheral device. For instance, feedback receiving module 212 may allow for the capture of feedback from at least one sensor connected to a user who is wearing the EEG-monitoring headset. The capture of feedback by feedback receiving module 212 may be synchronized with the driving of one or more peripheral devices by external device control module 210. In some instances, feedback receiving module 212 may allow mobile computing device 102 to capture sensor data from a peripheral device that is being actively controlled by external device control module 210 at the same time.

Avatar generation module 214 may enable mobile computing device 102 to cause display 202 to display an avatar representing expected motion (e.g., of a human user of a peripheral device) based on the received EEG data stream. In some examples, the avatar may be displayed on display 202 of mobile computing device 102 and an outgoing wireless communication signal may be transmitted from mobile computing device 102 to control a peripheral device contemporaneously (e.g., during active operation of the peripheral device). In further examples, the avatar may be displayed on display 202 of mobile computing device 102 at a point in time (e.g., during user training) before an outgoing wireless communication signal is transmitted from mobile computing device 102 to a peripheral device. In yet further examples, the avatar may be displayed on display 202 of mobile computing device 102 and a first outgoing wireless communication signal may be transmitted from mobile computing device 102 to a first peripheral device contemporaneously, but at a point in time before a second outgoing wireless communication signal is transmitted from mobile computing device 102 to a second peripheral device. For instance, the first peripheral device may provide sensory motor feedback, while the second peripheral device controls user motion like a robotic walking apparatus. The user may then visualize the avatar and receive sensory motor feedback signals during training, before actively using the robotic walking apparatus.

In further examples, avatar generation module 214 or a different module may allow mobile computing device 102 to directly provide feedback to a user in other ways as well or instead. For instance, mobile computing device 102 may be configured to vibrate to provide feedback during operation of a wearable robotic walking apparatus.

In some implementations, mobile computing device 102 and one or more peripheral devices may be operatively linked via one or more electronic communication links to allow for data transmission between devices. For example, such electronic communication links may be established wirelessly, at least in part, via a Bluetooth connection or a network such as the Internet and/or other networks. The format of each respective data transmission can include one or more of a variety of different formats including: text formats, image formats, extensible mark-up language (XML), Simple Network Maintenance Protocol (SNMP) formats, database tables, a flat file format, a format associated with a page definition language, or another format. It will be appreciated that this is not intended to be limiting, and that the scope of this disclosure includes implementations in which mobile computing device 102 and one or more peripheral devices may be operatively linked via some other communication media.

Mobile computing device 102 may include one or more processors 204 configured to execute computer program modules. One or more of the computer program modules may also be configured to enable an expert or user associated with the mobile computing device 102 to interface with one or more modules, and/or provide other functionality attributed herein to mobile computing device 102. For instance, a developer may interface with external device control module 210 to provide one or more brain signal processing algorithms and/or to specify a particular set of peripheral devices to be controlled.

Mobile computing device 102 may include electronic storage including machine-readable instructions 206, one or more processors 204, and/or other components. Mobile computing device 102 may include communication lines, or ports to enable the exchange of information with a network and/or other computing platforms. Illustration of mobile computing device 102 in FIG. 2 is not intended to be limiting. Mobile computing device 102 may include a plurality of hardware, software, and/or firmware components operating together to provide the functionality attributed herein to mobile computing device 102.

Mobile computing device 102 can include one or more computer-readable storage media configured to store data and/or instructions that can be read and/or accessed by at least one of processors 204. The one or more computer-readable storage media can include one or more volatile and/or non-volatile storage components, such as optical, magnetic, organic or other memory or disc storage, which can be integrated in whole or in part with at least one of processors 204. The computer-readable storage media can include one or more components that store data for short periods of time like register memories, processor caches, and/or random access memories (RAM). The computer-readable storage media can include non-transitory computer readable media that stores program code and/or data for longer periods of time, such as secondary or persistent long term storage; for example, read only memory (ROM), optical or magnetic disks, compact-disc read only memory (CD-ROM). In some embodiments, electronic storage can be implemented using a single physical device (e.g., one optical, magnetic, organic or other memory or disk storage unit), while in other embodiments, electronic storage can be implemented using two or more physical devices. The electronic storage media may include one or both of system storage that is provided integrally (i.e., substantially non-removable) with mobile computing device 102 and/or removable storage that is removably connectable to mobile computing device 102 via, for example, a port (e.g., a USB port, a firewire port, etc.) or a drive (e.g., a disk drive, etc.). Electronic storage may store software algorithms, information determined by processor(s) 204, information received from one or more peripheral devices, and/or other information that enables mobile computing device 102 to function as described herein.

Processor(s) 204 can include one or more general purpose processors, central processing units (CPUs), CPU cores, and/or one or more special purpose processors (e.g., graphics processing units (GPUs), digital signal processors (DSPs), field programmable gated arrays (FPGAs), application specific integrated circuits (ASICs)). Although processor(s) 204 is shown in FIG. 2 as a single entity, this is for illustrative purposes only. In some implementations, processor(s) 204 may include a plurality of processing units. These processing units may be physically located within the same device, or processor(s) 204 may represent processing functionality of a plurality of devices operating in coordination. Processors 204 can be configured to execute computer-readable instructions, such as machine-readable instructions 206 that are contained in memory and/or other instructions as described herein. For example, processor(s) 204 may be configured to execute modules 208, 210, 212, and/or 214, and/or other modules. Processor(s) 204 may be configured to execute modules 208, 210, 212, and/or 214, and/or other modules by software; hardware; firmware; some combination of software, hardware, and/or firmware; and/or other mechanisms for configuring processing capabilities on processor(s) 204. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 208, 210, 212, and/or 214 are illustrated in FIG. 2 as being implemented within a single processing unit, in implementations in which processor(s) 204 includes multiple processing units, one or more of modules 208, 210, 212, and/or 214 may be implemented remotely from the other modules. The description of the functionality provided by the different modules 208, 210, 212, and/or 214 described herein is for illustrative purposes, and is not intended to be limiting, as any of modules 208, 210, 212, and/or 214 may provide more or less functionality than is described. For example, one or more of modules 208, 210, 212, and/or 214 may be eliminated, and some or all of its functionality may be provided by other ones of modules 208, 210, 212, and/or 214. As another example, processor(s) 204 may be configured to execute one or more additional modules that may perform some or all of the functionality attributed below to one of modules 208, 210, 212, and/or 214.

Figure 3:
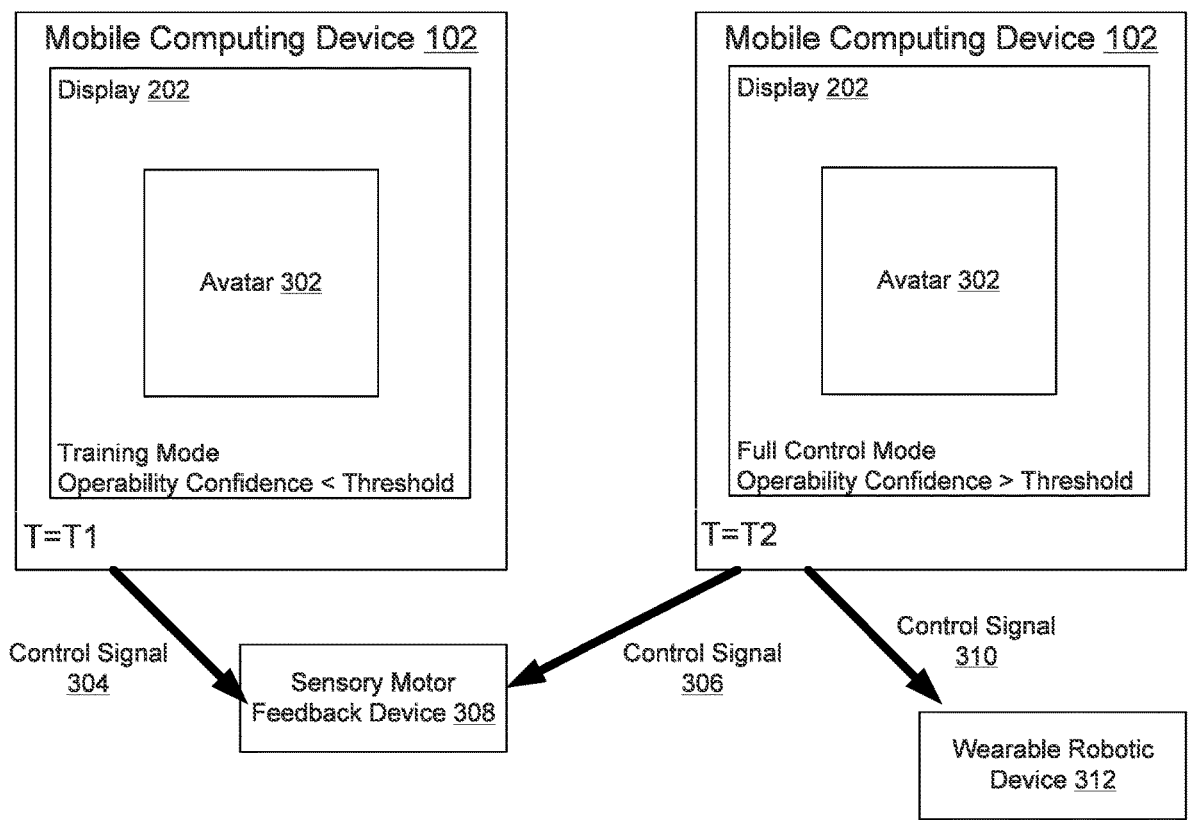
FIG. 3 illustrates example communications between a mobile computing device and peripheral devices, in accordance with example embodiments.

Next, FIG. 3 illustrates example communications between a mobile computing device and peripheral devices, in accordance with example embodiments. More specifically, at a first time T=T1, mobile computing device 102 may be controlled to operate in a training mode. In the training mode, brain signal data from a user may be used to control avatar 302 on display 202 in order to simulate user movements (e.g., walking, stopping, or turning) that would result if the brain signal data were used during full control mode of a peripheral device. In addition, mobile computing device 102 may be controlled to transmit control signal 304 to sensory motor feedback device 308 to allow the user to experience sensory motor feedback that would also be provided during full control mode. However, mobile computing device 102 may limit the user to the training mode as long as a measure of operability confidence is less than a threshold level. In some examples, the operability confidence (e.g., a probability of successful walking with a robotic apparatus) may be displayed on display 202 to provide a user with an indication of his or her progress. In further examples, evaluation of brain signal data to determine the operability confidence and/or probability of successful operation may be done using a machine learning model trained by data from other users. Mobile computing device 102 may also be configured to train a locally stored machine learning model based on collected brain signal data and/or provide training data for future optimization of brain training (e.g., by streaming collected brain signal data to a cloud server).

At a later time T=T2, mobile computing device 102 may be switched to operate in a full control mode based on the operability confidence being above a threshold level. In the full control mode, mobile computing device 102 may transmit control signal 306 to sensory motor feedback device 308 and control signal 310 to wearable robotic device 312 at the same time. In this manner, the user may experience the same sensory feedback in active operation/motion as he or she did during training. The avatar 302 may also be displayed on display 202 and animated to simulate the user's motion in real time as a further method of user feedback. Since the avatar motion is essentially the same as that of, for example, an external robotic exoskeleton, such a simulated environment will allow users to easily train at home or in bed (for paralyzed patients) to ensure their brain control signals reach sufficient accuracy before they physically use the external robotic exoskeleton. A process is therefore provided to facilitate neuronal rehabilitation and then physical rehabilitation. Importantly, the brain signals from the full control mode and the training signals during machine learning can also be mixed in a hybrid mode to assist novice users to achieve more efficient training and higher accuracy in brain control.

It should be understood that FIG. 3 illustrates one example of level or mode switching by a mobile BCI, but many other examples are possible. More generally, different sets of peripheral devices, and/or different levels of functionality for individual peripheral devices, may be dynamically activated or deactivated based on user capability as reflected by the user's brain signals. One or more types of user feedback, including visual display, auditory feedback, haptic feedback, and/or other types of feedback may be provided by a mobile BCI system to help the user train and understand his or her progress. In this manner, the mobile BCI system may automatically allow for multiple modes or levels of training and/or operation, with real-time mode switching, for instance, to facilitate enabling a patient to regain neuromuscular ability over time.

Figure 4:
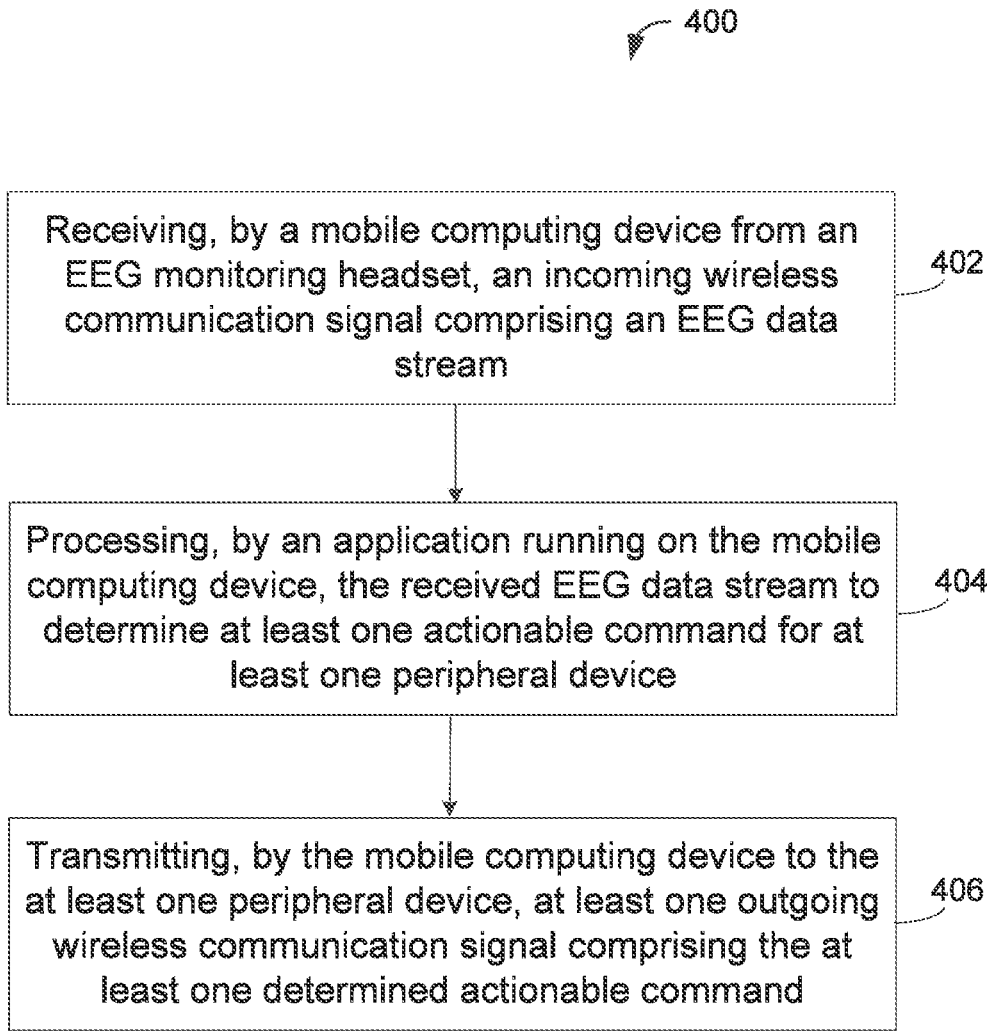
FIG. 4 is a block diagram of a method, in accordance with example embodiments.

Next, FIG. 4 illustrates a method 400, in accordance with one or more implementations. In some examples, the method 400 may be carried out by a mobile computing device such as mobile computing device 102 described with reference to FIGS. 1, 2, and/or 3. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

Block 402 may include receiving, by a mobile computing device from an EEG monitoring headset, an incoming wireless communication signal including an EEG data stream. Block 402 may be performed by one or more hardware processors configured by machine-readable instructions including a module that is the same as or similar to communication signal receiving module 208 illustrated and described with respect to FIG. 2, in accordance with one or more implementations.

Block 404 may include processing, by an application running on the mobile computing device, the received EEG data stream to determine at least one actionable command for at least one peripheral device. Block 404 may be performed by one or more hardware processors configured by machine-readable instructions including a module that is the same as or similar to external device control module 210 and/or feedback receiving module 212 illustrated and described with respect to FIG. 2, in accordance with one or more implementations.

Block 406 may include transmitting, by the mobile computing device to the at least one peripheral device, at least one outgoing wireless communication signal including the at least one determined actionable command. Block 406 may be performed by one or more hardware processors configured by machine-readable instructions including a module that is the same as or similar to external device control module 210 and/or feedback receiving module 212 illustrated and described with respect to FIG. 2, in accordance with one or more implementations.

The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

Figure 5:
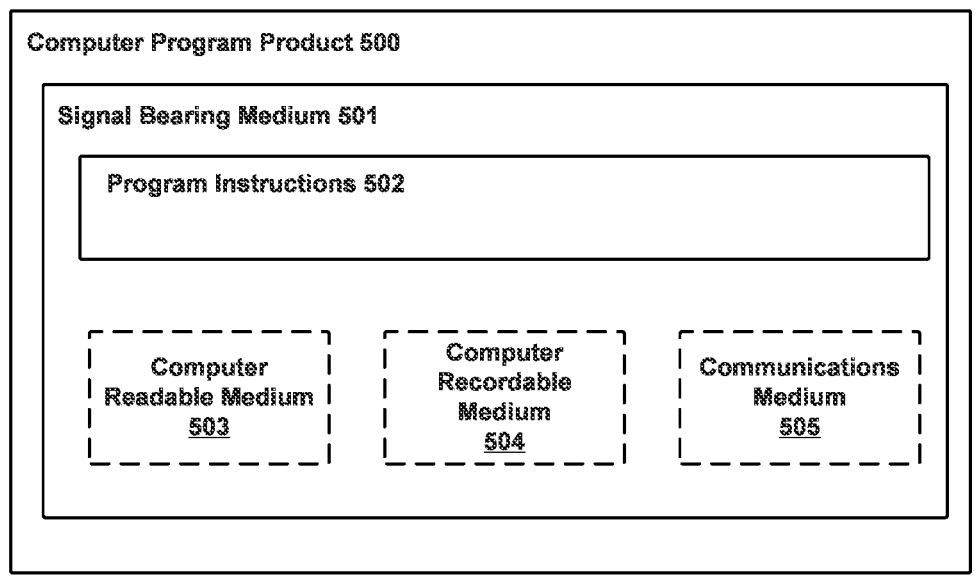
FIG. 5 is a schematic illustrating a conceptual partial view of an example computer program product that includes a computer program for executing a computer process on a computing device, in accordance with example embodiments.

In some embodiments, the disclosed methods can be implemented as computer program instructions encoded on a non-transitory computer-readable storage media in a machine-readable format, or on other non-transitory media or articles of manufacture. FIG. 5 is a schematic illustrating a conceptual partial view of an example computer program product 500 that includes a computer program for executing a computer process on a computing device, arranged according to at least some embodiments presented herein.

In one embodiment, the example computer program product 500 is provided using a signal bearing medium 501. The signal bearing medium 501 can include one or more programming instructions 502 that, when executed by one or more processors can provide functionality or portions of the functionality described above with respect to FIGS. 1-4. In some examples, the signal bearing medium 501 can encompass a computer-readable medium 503, such as, but not limited to, a hard disk drive, a Compact Disc (CD), a Digital Video Disk (DVD), a digital tape, memory, etc. In some implementations, the signal bearing medium 501 can encompass a computer recordable medium 504, such as, but not limited to, memory, read/write (R/W) CDs, R/W DVDs, etc. In some implementations, the signal bearing medium 501 can encompass a communications medium 505, such as, but not limited to, a digital and/or an analog communication medium (e.g., a fiber optic cable, a waveguide, a wired communications link, a wireless communication link, etc.). Thus, for example, the signal bearing medium 501 can be conveyed by a wireless form of the communications medium 505 (e.g., a wireless communications medium conforming to the IEEE 802.11 standard or other transmission protocol).

The one or more programming instructions 502 can be, for example, computer executable and/or logic implemented instructions. In some examples, a computing device can be configured to provide various operations, functions, or actions in response to the programming instructions 502 conveyed to the computing device by one or more of the computer-readable medium 503, the computer recordable medium 504, and/or the communications medium 505.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements can be omitted altogether according to the desired results. Further, many of the elements that are described are functional entities that can be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A mobile computing device comprising:
   at least one processor configured to execute instructions from one or more modules, the one or more modules comprising:
   an EEG signal reading module configured to receive an incoming communication signal comprising an EEG data stream;
   an external device control module configured to:
   determine at least one actionable command;
   transmit a first communication signal to a robotic device based on the at least one actionable command to cause active operation of the robotic device; and
   transmit a second communication signal to a sensory feedback device to cause the sensory feedback device to provide tactile feedback during operation of the robotic device;
   a feedback receiving module; and
   an avatar generation module, and
   a display.

2. The mobile computing device of claim 1, wherein the incoming communication signal is a continuous representation of brain signals or an intermittent representation of brain signals of a user.

3. The mobile computing device of claim 1, wherein the feedback receiving module is configured to receive an incoming signal from a sensor connected to a user.

4. The mobile computing device of claim 1, wherein the EEG data stream is detected by an EEG headset worn by a user.

5. The mobile computing device of claim 4, wherein the avatar generation module enables the mobile computing device to display an avatar on the display representing an expected motion of the robotic device based on the at least one actionable command.

6. The mobile computing device of claim 1, wherein the feedback receiving module enables the mobile computing device to receive an incoming wireless communication signal from at least one peripheral device.

7. The mobile computing device of claim 6, wherein the incoming wireless communication signal is sensor data from the robotic device.

8. The mobile computing device of claim 1, wherein the one or more modules operate simultaneously.

9. The mobile computing device of claim 1, wherein the robotic device is coupled to a paralyzed portion of a user and the sensory feedback device is coupled to a body part of the user that the user can feel.

10. A system comprising:
    an EEG monitoring headset;
    a robotic device;
    a sensory feedback device;
    a mobile computing device comprising:
    a processor in communication with the EEG monitoring headset, the robotic device, and the sensory feedback device, the processor configured to:
    determine an actionable command based on EEG data received from the EEG monitoring headset;
    transmit a first signal to the robotic device to cause active operation of the robotic device; and
    transmit a second signal to the sensory feedback device to cause the sensory feedback device to provide tactile feedback during operation of the robotic device; and
    a display.

11. The system of claim 10, wherein the EEG data comprises a continuous representation of brain signals or an intermittent representation of brain signals of a user of the EEG monitoring headset.

12. The system of claim 10, wherein the robotic device and/or sensory feedback device comprise one or more sensors.

13. The system of claim 12, wherein the one or more sensors are operable to provide feedback to the processor.

14. The system of claim 13, wherein the sensory feedback device is a wrist-mounted vibrating device.

15. The system of claim 10, wherein the robotic device is a robotic walking apparatus, a robotic cart, or a robotic arm.

16. The system of claim 10, wherein the sensory feedback device provides an indication to a user of a motion of the robotic device.

17. The system of claim 16, wherein the display is configured to display an avatar.

18. The system of claim 17, wherein the avatar is simulated to match a motion of the robotic device.

19. The system of claim 10, wherein the robotic device is coupled to a paralyzed portion of a user and the sensory feedback device is coupled to a body part of the user that the user can feel.

* * * * *